(12) United States Patent
Buss

(10) Patent No.: US 6,793,872 B1
(45) Date of Patent: Sep. 21, 2004

(54) METHOD FOR MAKING CARGO LINERS AND MATS WITH CHANNEL EDGE

(75) Inventor: Kenton A. Buss, Oxford, KS (US)

(73) Assignee: Winfield Consumer Products, Inc., Winfield, KS (US)

( * ) Notice: Subject to any disclaimer, the term of this patent is extended or adjusted under 35 U.S.C. 154(b) by 152 days.

(21) Appl. No.: 09/595,769

(22) Filed: Jun. 16, 2000

(51) Int. Cl.[7] ............................................. B29C 51/10
(52) U.S. Cl. ....................... 264/554; 264/138; 264/544; 264/DIG. 78; 425/387.1; 425/388
(58) Field of Search ................................. 264/554, 138, 264/163, 544, DIG. 78; 475/387.1, 388

(56) References Cited

U.S. PATENT DOCUMENTS

| | | | |
|---|---|---|---|
| 2,081,740 A | | 5/1937 | Farnham |
| 3,161,915 A | * | 12/1964 | Thiel ......................... 425/305.1 |
| 3,190,946 A | * | 6/1965 | Keyes .......................... 264/548 |
| 3,337,664 A | * | 8/1967 | Lyon ............................ 264/89 |
| 3,402,232 A | | 9/1968 | De Rusha |
| 3,640,666 A | | 2/1972 | Jope et al. |
| 3,805,657 A | * | 4/1974 | Simpson .................. 83/522.24 |
| 3,827,130 A | | 8/1974 | Baumann |
| 3,954,923 A | * | 5/1976 | Valyi ........................... 264/513 |
| 4,086,045 A | * | 4/1978 | Thiel et al. ............... 425/326.1 |
| 4,256,690 A | | 3/1981 | Sabba |
| 4,664,865 A | | 5/1987 | Kulis |
| 4,704,237 A | | 11/1987 | Taylor, Jr. et al. |
| 4,979,283 A | | 12/1990 | Kurita et al. |
| 5,314,324 A | * | 5/1994 | Wendt ........................ 425/299 |
| 5,358,214 A | | 10/1994 | Batlle |
| 5,759,591 A | * | 6/1998 | Rhoades et al. .......... 425/387.1 |
| 5,773,540 A | * | 6/1998 | Irwin et al. ............... 425/387.1 |
| 5,795,535 A | | 8/1998 | Giovannone et al. |
| 5,798,079 A | * | 8/1998 | Freek et al. ................. 264/554 |
| 6,010,062 A | * | 1/2000 | Shimono ..................... 229/400 |

\* cited by examiner

Primary Examiner—Edmund H. Lee
(74) Attorney, Agent, or Firm—Fellers, Snider, Blankenship, Bailey & Tippens, P.C.

(57) ABSTRACT

A method for making a cargo liner or a floor mat using a plastic molding process wherein a male mold includes a steel rule about its perimeter or a female mold includes a groove about its perimeter creating a ridge in the molded article to allow trimming of surplus material from the article along the ridge such that the dimensions of the finished article are determined by the ridge. In a preferred embodiment, an article is molded in a thermoforming process, the article thus produced includes a channel edge which enhances the appearance of the finished article and improves its structural integrity.

6 Claims, 3 Drawing Sheets

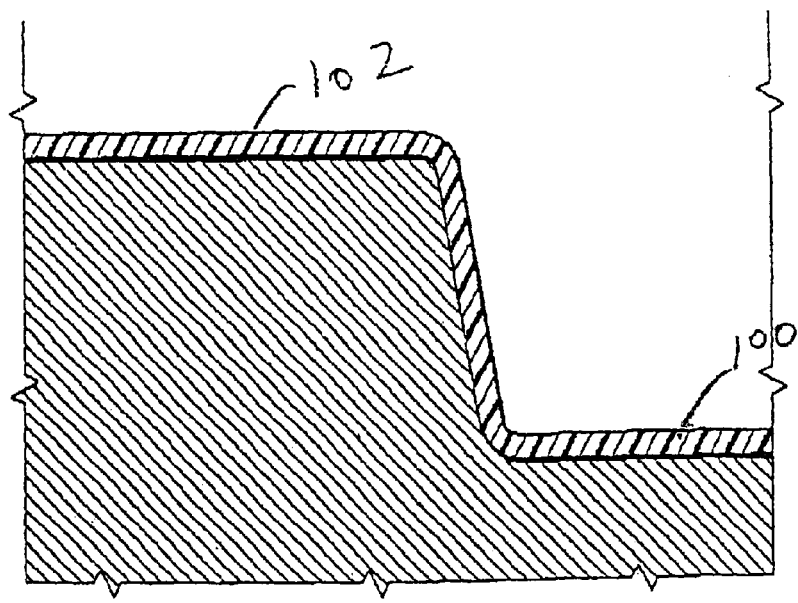
Fig. 2
*(PRIOR ART)*
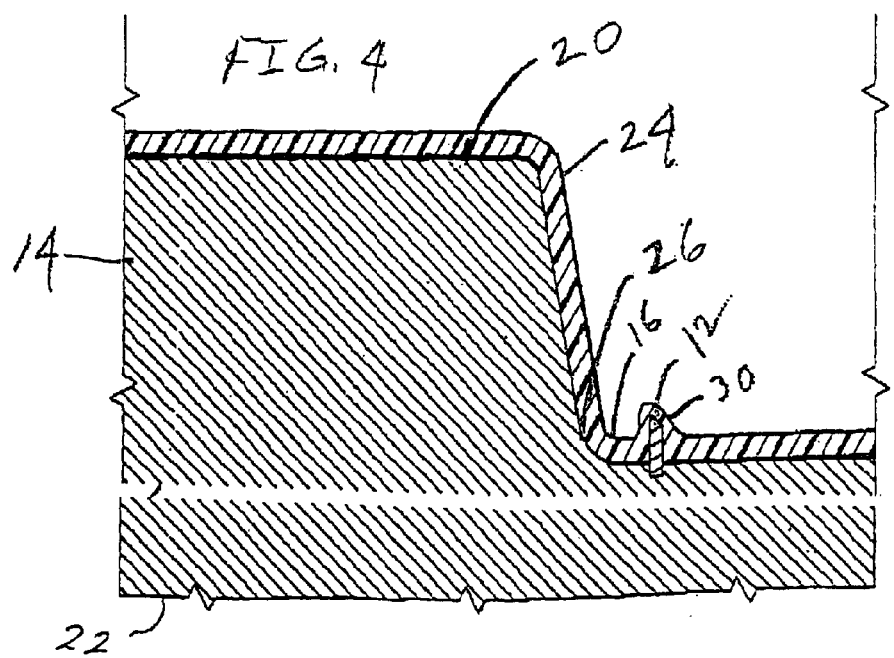

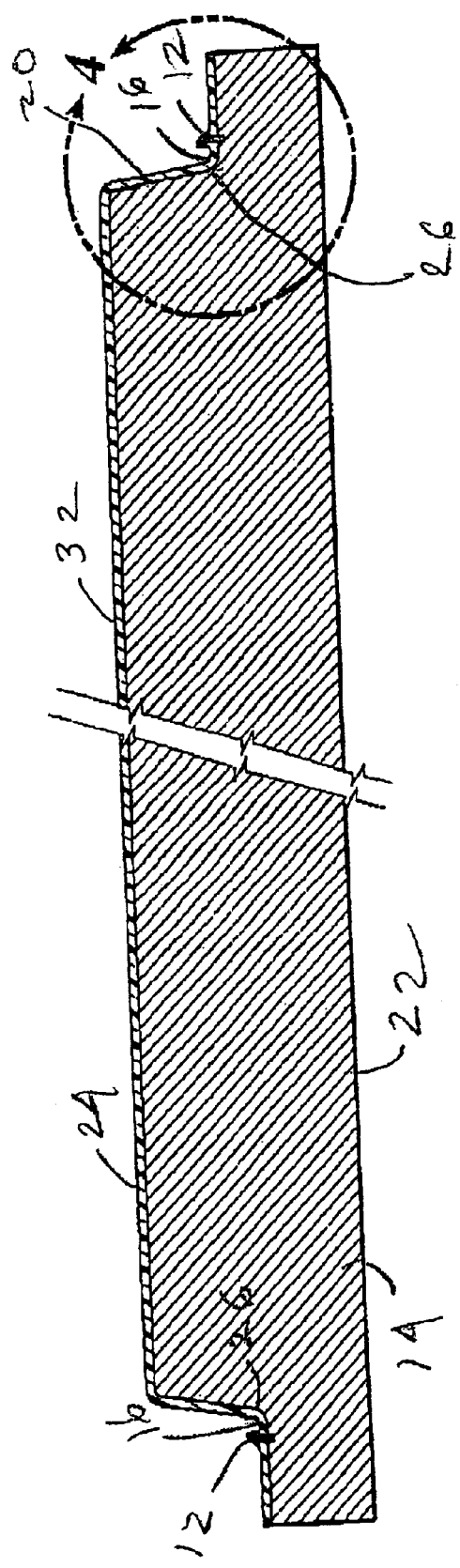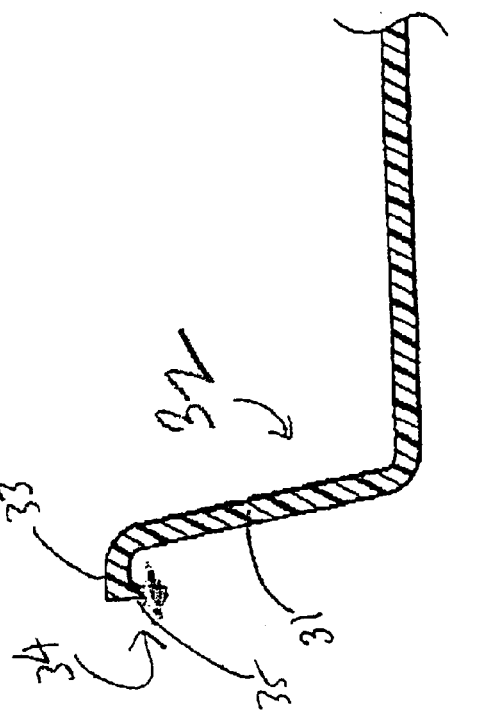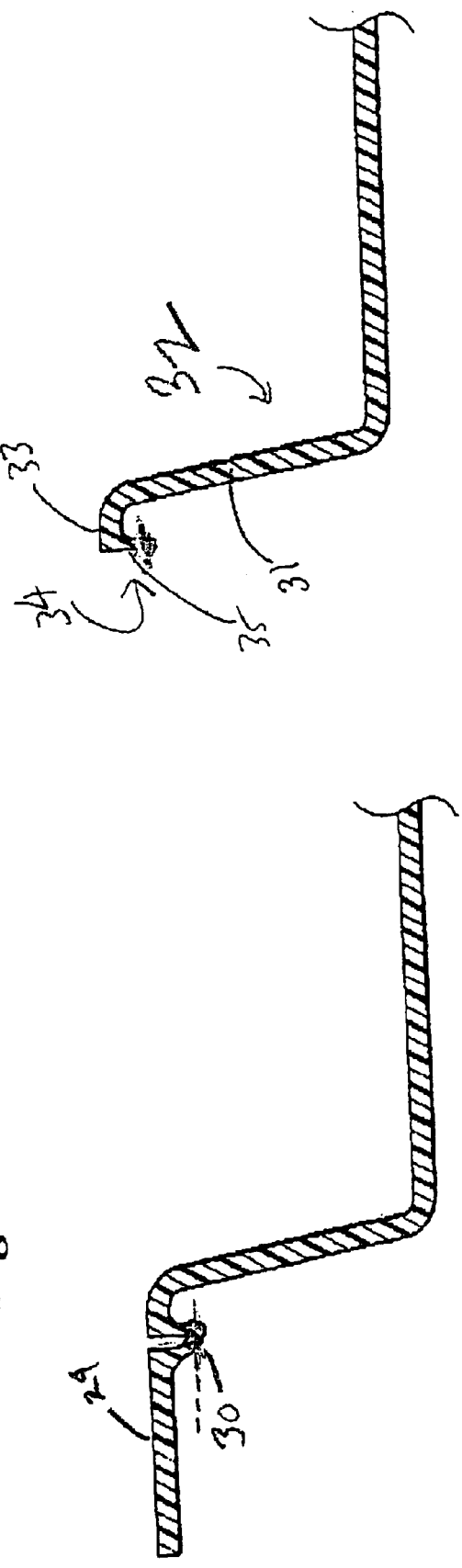

ic thermoforming process for producing cargo liners or floor mats for vehicles which include a channel edge about at least a portion of the perimeter of the liners or mats.

METHOD FOR MAKING CARGO LINERS AND MATS WITH CHANNEL EDGE

BACKGROUND OF THE INVENTION

1. Field of the Invention

This invention relates generally to a method for making cargo liners and floor mats for vehicles. More particularly, but not by way of limitation, the present invention relates to a thermoforming process for producing cargo liners or floor mats for vehicles which include a channel edge about at least a portion of the perimeter of the liners or mats.

2. Background

Cargo liners for pickup trucks, SUVs, vans, and even automobile trunks are well known in the art, as are floor mats for all types of vehicles. A common method for manufacturing such devices is a plastic thermoforming process, in particular vacuum or pressure forming.

Vacuum forming and pressure forming are well known in the art. Generally, to vacuum form a plastic article, a mold is produced, either as a male likeness of the article over which material will be drawn, or a female likeness of the article into which material will be drawn. The mold is typically drilled with small passageways through which air may pass from the molding surfaces to the backside of the mold. A sheet of plastic is then heated until it becomes extremely pliable. The heated plastic is then placed adjacent the mold and vacuum is applied to the backside of the mold. Air passes through the passageways to create low pressure at the surface of the mold, thereby drawing the heated plastic tight against the mold so that the plastic takes on the shape of the mold. The plastic is then cooled and the molded sheet is lifted off the mold. Alternatively, in some cases, compressed air is applied to the backside of the mold so that the molded plastic is blown off of the mold. In a final step, surplus material is trimmed from the edge of the molded article, typically with a router.

Pressure forming is performed in much the same manner except, compressed air is applied to the heated sheet to press it onto the mold. In a sense, this is the same as the vacuum operation in that relatively high pressure air is on the outside of the plastic sheet and relatively low pressure air is on the mold side of the plastic sheet.

In either operation, water or forced air may be used to expedite cooling of the molded article.

While other methods are applicable to forming cargo liners and floor mats, thermoforming of sheet materials has proven to provide a cost effective method of producing finished product of consistent quality. However, a limitation of thermoforming arises in the subsequent trimming operation to remove surplus material from the perimeter of the article. A trimming guide may be used to guide the router operator in trimming the article. While a guide may work quite well when all of the trimming occurs in a single plane, the guide may become quite complex when trimming complex articles. Furthermore, the trimming operation may introduce some variability into the dimensions of the finished article and it is often difficult to produce a straight edge of consistent width.

Articles formed of relatively soft material may be hand trimmed using a knife. Unfortunately, hand trimming will often leave the trimmed edge of part irregular and the consistency of the operation is dependent on the skill of the individual. In addition, hand trimming places relatively large stresses on the wrists of the individual performing the operation.

Therefore it can be seen that there is a need for a method for making cargo liners and floor mats using a thermoforming process which facilitates trimming of the molded part in a secondary operation.

It is thus an object of the present invention to provide a method for thermoforming a cargo liner or floor mat wherein a channel edge is formed during the molding process to facilitate cutting and to provide an improved article.

SUMMARY OF THE INVENTION

The present invention provides a method for making cargo liners and floor mats using a plastic molding process. In the inventive process, a steel rule or a groove is incorporated into the mold to produce a ridge in the molded part to facilitate subsequent trimming.

In a preferred embodiment, when heated plastic is drawn over a steel rule during a thermoforming process, a channel edge is formed in the plastic article about its perimeter. During a subsequent trimming operation to remove surplus material, trimming is performed on the ridge created by the steel rule thereby reducing variations in the edge which result from the trimming operation to produce an edge which enhances the appearance of the finished article with less dependance on operator skill during the trimming operation. An article produced by the inventive process will include a channel edge about at least a portion of its perimeter.

While the inventive process is applicable to virtually any molding operation which requires a subsequent trimming operation, it is especially well suited to thermoforming of plastic sheet materials. By way of example and not limitation, such processes include vacuum forming, pressure forming, and rotational molding. Furthermore, such forming may involve either a male mold or a female mold.

Further objects, features, and advantages of the present invention will be apparent to those skilled in the art upon examining the accompanying drawings and upon reading the following description of the preferred embodiments.

BRIEF DESCRIPTION OF THE DRAWINGS

FIG. 2 provides a cutaway view of a prior art mold with a sheet of plastic material drawn over the mold.

FIG. 3 provides a cutaway view of the an inventive male mold incorporating a steel rule.

FIG. 4 provides a cutaway detail of an inventive male mold incorporating a steel rule.

FIG. 5 provides a cutaway view of a cargo liner made with the inventive method prior to the trimming operation.

FIG. 6 provides a cutaway view of a cargo liner made with the inventive method after the trimming operation.

DETAILED DESCRIPTION OF THE PREFERRED EMBODIMENT

Figure 1:
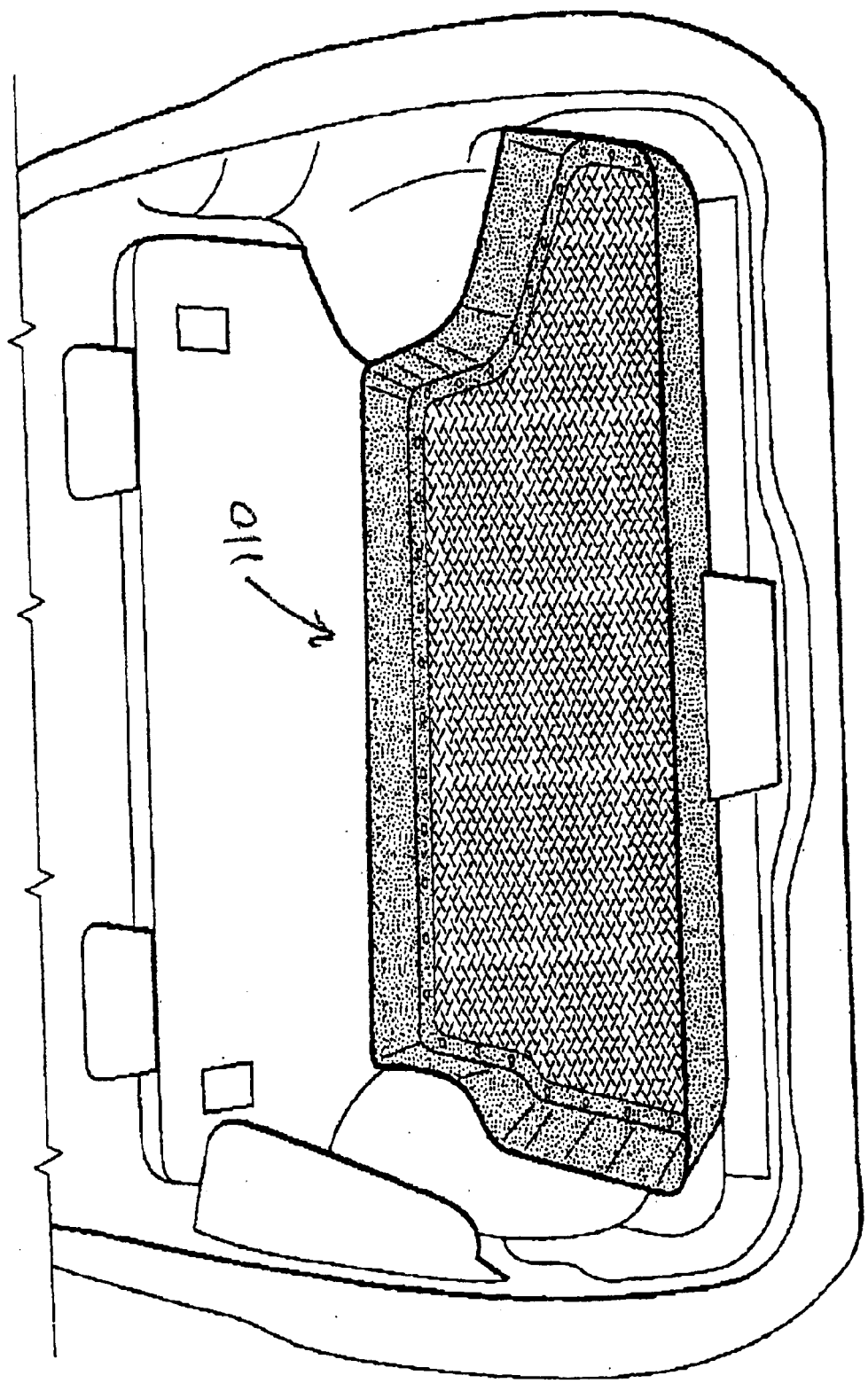
FIG. 1 provides an elevational view of a cargo liner made with the inventive method in its general environment.

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

The inventive method preferably relates generally to the thermoforming of plastic liners. By way of example and not limitation, the inventive method is ideally suited for the production of cargo liners for trucks, sport utility vehicles, automobile trunks, boats, etc. and for floor mats for vehicles in general. The inventive thermoforming method produces a ridge in the molded article which greatly facilitates trimming, enhances the appearance of the finished article, and improves the structural integrity of the finished article.

Thermoforming processes include vacuum forming, pressure forming, rotational molding, and the like. Thermoforming processes may utilize either a male mold wherein the plastic material is drawn over the mold, a female mold wherein the material is drawn into the mold, or a combination of both male and female details incorporated into a single mold. The inventive method is applicable to all such thermoforming processes. For the sake of simplicity, the preferred embodiment of the inventive method will be discussed in reference to a vacuum forming process however the invention is not so limited.

Referring first to FIGS. 3 and 4, a preferred embodiment of a mold for use with the inventive method includes a steel rule 12 incorporated into male mold 14, rule 12 being spaced substantially an equal distance 16 from the perimeter 26 of article 32 at all points along its path. The mold 14 is drilled with small passageways (not shown) such that air may pass freely from the molding surfaces 20 to the backside 22 of the mold. When vacuum is applied to the backside of mold 14, low pressure will be present at the molding surfaces 20. A sheet of thermoplastic material 24 is heated until the sheet 24 becomes extremely pliable. Sheet 24 is then placed against the surface of mold 14 and vacuum is applied to the backside 22 of mold 14, drawing sheet 24 tightly over mold 14. Steel rule 12 creates a ridge in sheet 14 which follows perimeter 26 of article 32. Sheet 24 is preferably cooled with water or forced air to accelerate the cooling process. Once cooled, sheet 24 is lifted from mold 14, or alternatively compressed air may be applied to the backside 22 of mold 14 to remove sheet 24 from mold 14. The shape impressed upon sheet 24 by mold 14 will remain upon removal of sheet 24 from mold 14. With the exception of the steel rule 12, the process described above is a vacuum forming process which is known in the art.

A prior art method of thermoforming is depicted in FIG. 2. Typically with a thermoformed article 102, surplus material 100 must be trimmed from around the molded article 102. A router is often used to perform this operation however, a guide or template is often used to improve the dimensional consistency and quality of such articles. Relatively soft thermoplastic materials may be hand trimmed with a knife to separate the molded part from the surplus material. However, hand trimming results in dimensional inconsistencies along the edges of these articles.

Trimming of articles formed by the inventive method requires no such guide or template. Instead, a router or saw is located a predetermined distance above a table top such that any material above a certain height will be removed and any material below the height will remain untouched. The height preferably being lower than the height of the ridge 30 (FIG. 5) created in sheet 14 by steel rule 12. Thus, when ridge 30 is passed under the router, trimming of the article will thus occur along ridge 30 as shown by the drawn line in FIG. 6. It will be obvious to those skilled in the art that the dimensions of article 32 (FIG. 6) will be determined by the position of ridge 30 independent of the skill of the operator performing the trimming and, furthermore, that no guides or templates are required to perform such trimming.

Relatively soft materials may be easily hand trimmed with a knife. The groove which is inherently formed on the side opposite the ridge, acts as a guide for the knife during a hand trimming operation. It will be apparent to those skilled in the art that the material at the bottom of the groove will be thinner than the original sheet of material thus reducing stresses placed on the wrists of the individual performing the hand trimming operation. These features facilitate faster, more accurate trimming resulting in increased production and lower scrap rates due to improper trimming.

Once trimmed, article 32 includes a substantially vertical peripheral wall portion 31, a transverse outer edge portion 33 and a nub 35, thus forming a channel edge 34, the width of which corresponds to the distance 16 between mold 14 and steel rule 12. Channel edge 34 provides an enhanced appearance to article 32 over articles produced by prior art methods. In addition, channel edge 34 improves the structural integrity of article 32.

In another embodiment, a groove is provided about the perimeter of a female mold. The groove is provided with passageways periodically about its path to ensure that the sheet will be drawn into the groove during the forming operation. The forming operation for a female mold is similar to the forming operation with a male mold 14 discussed hereinbefore. The sheet is first heated, placed over the opening of the cavity, vacuum is applied to the backside of the mold thereby tightly drawing the sheet into the cavity. After cooling, the sheet is removed from the cavity or, alternatively, compressed air may be applied to the backside of the cavity to separate the sheet from the mold. Trimming of an article molded in a female mold is identical to the trimming of article 24 formed over male mold 14.

A cargo liner 110 produced by the inventive method is shown in FIG. 1. Cargo liner 110 includes a channel edge (not shown) which is formed as article of the inventive method. Preferably, the channel edge is of substantially uniform width giving cargo liner 110 an enhanced appearance as compared to liners produced by prior art methods.

Although the inventive method is discussed herein and described in reference to the production of a cargo liner, it is equally applicable to the production of floor mats for vehicles or any other type of formed liner.

As will be apparent to those skilled in the art, sheet goods for thermoforming are available in a variety of materials and thicknesses. The inventive method is applicable to all such sheet goods.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method for making a molded vehicle liner, wherein said liner includes a substantially vertical peripheral wall portion and a transverse outer edge portion and said vehicle liner is either a cargo liner or floor mat comprising:

(a) heating a sheet of plastic material having a mold side and an exposed side to a first temperature, said first temperature being consistent with forming said sheet of plastic material in a thermoforming process;

(b) placing said mold side of said sheet of plastic material over a mold, said mold having a first surface for forming said substantially vertical peripheral wall portion, a second surface substantially perpendicular to said first surface, and a steel rule placed along said second surface at a predetermined distance from said first surface for forming said outer edge portion;

(c) applying a vacuum to said mold or compressed gas to said exposed side of said sheet of plastic material such that air pressure on said mold side is less than the air pressure on said exposed side;

(d) forming a ridge over said steel rule along at least a part of said outer edge portion, said ridge being of a substantially uniform height;

(e) cooling said sheet of plastic material to a second temperature, said second temperature being consistent with said sheet of plastic material retaining its molded shape;

(f) releasing said vacuum from said mold or said compressed gas from said exposed side;

(g) removing said sheet of plastic material from said mold; and (h) after removing said sheet of plastic material from said mold, cutting said sheet of plastic material along said ridge to release said liner from said sheet.

2. The method according to claim 1, wherein said steel rule encompasses the entire periphery of the mold and step (d) further includes forming said ridge about the entirety of said outer edge portion at a substantially coequal distance from said wall portion.

3. The method according to claim 2, wherein there is provided after step (h) a channel edge of a substantially uniform width about the periphery of said liner.

4. A method for making a molded vehicle liner, wherein said liner includes an outer edge portion and said vehicle liner is either a cargo liner or floor mat comprising:

(a) molding a liner having an outer edge portion from a sheet of plastic material in a mold having a steel rule encompassing the periphery of said mold, said outer edge portion having a ridge along at least a part of said outer edge portion, said ridge being formed over said steel rule and said ridge being of a substantially uniform height;

(b) removing said liner from said mold; and (c) after removing said liner from said mold, cutting said liner along said ridge to release said liner from said sheet of plastic material such that said ridge defines the outer edge of said liner.

5. The method according to claim 4, wherein step (a) further includes molding said ridge about the entirety of said outer edge portion.

6. A method for making a molded vehicle liner from a sheet of thermoforming plastic, wherein said liner includes a continuous outer edge portion and said vehicle liner is either a cargo liner or floor mat comprising:

(a) heating a sheet of plastic material having a mold side and an exposed side to a first temperature, said first temperature being consistent with forming said sheet of thermoforming plastic in a thermoforming process;

(b) placing said mold side of said sheet of thermoforming plastic over a mold, said mold having a steel rule of substantially uniform height positioned about the periphery of said mold;

(c) applying a vacuum to said mold or compressed gas to said exposed side of said sheet of thermoforming plastic such that air pressure on said mold side is less than the air pressure on said exposed side;

(d) forming a ridge over said steel rule along the entirety of said outer edge portion such that said thermoforming plastic is thinner than the original thickness of the sheet of thermoforming plastic along said ridge to facilitate a trimming operation;

(e) cooling said sheet of plastic material to a second temperature, said second temperature being consistent with said sheet of thermoforming plastic retaining its molded shape;

(f) releasing said vacuum from said mold or said compressed gas from said exposed side;

(g) removing said sheet of thermoforming plastic from said mold; and (h) trimming said sheet of thermoforming plastic along said ridge where said thermoforming plastic is thinner to release said liner from said sheet.

* * * * *